United States Patent [19]

Ulrich et al.

[11] Patent Number: 5,466,200
[45] Date of Patent: Nov. 14, 1995

[54] INTERACTIVE EXERCISE APPARATUS

[75] Inventors: W. Thatcher Ulrich, Boston; Harvey A. Koselka; Aaron F. Bobick, both of Newton; Michael H. Benjamin, Quincy, all of Mass.

[73] Assignee: CyberGear, Inc., Cambridge, Mass.

[21] Appl. No.: 189,896

[22] Filed: Feb. 1, 1994

Related U.S. Application Data

[63] Continuation-in-part of Ser. No. 12,305, Feb. 2, 1993, abandoned.

[51] Int. Cl.⁶ .................................................. A63B 21/00
[52] U.S. Cl. .................. 482/4; 482/1; 482/3; 482/6; 482/57; 482/901
[58] Field of Search .............................. 482/1–8, 52, 53, 482/57, 72, 900–902; 434/157, 247

[56] References Cited

U.S. PATENT DOCUMENTS

| | | | |
|---|---|---|---|
| 3,686,776 | 8/1972 | Dahl | 35/11 |
| 3,722,884 | 3/1973 | Brown | 273/1 |
| 3,767,195 | 10/1973 | Dimick . | |
| 3,903,613 | 9/1975 | Bisberg | 35/11 |
| 4,049,262 | 9/1977 | Cunningham, Jr. | 272/1 |
| 4,141,630 | 2/1979 | Emmons | 352/132 |
| 4,170,834 | 10/1979 | Smart | 434/157 |
| 4,196,528 | 4/1990 | Foerst | 35/11 |
| 4,358,105 | 11/1982 | Sweeney, Jr. . | |
| 4,418,911 | 12/1983 | Bowers et al. | 273/85 |
| 4,461,470 | 7/1984 | Astroth et al. | 273/85 |
| 4,464,117 | 8/1984 | Foerst | 434/67 |
| 4,478,407 | 10/1984 | Manabe | 272/18 |
| 4,512,567 | 4/1985 | Phillips | 272/73 |
| 4,512,567 | 4/1985 | Phillips . | |
| 4,527,980 | 7/1985 | Miller | 434/55 |
| 4,542,897 | 9/1985 | Melton et al. . | |
| 4,572,509 | 2/1986 | Sitrick | 273/85 |
| 4,616,829 | 10/1986 | Smack, Sr. et al. | 273/86 |
| 4,630,817 | 12/1986 | Buckley | 272/73 |
| 4,637,605 | 1/1987 | Ritchie | 272/73 |
| 4,709,917 | 12/1987 | Yang | 272/73 |
| 4,710,129 | 12/1987 | Newman et al. | 434/55 |
| 4,711,447 | 12/1987 | Mansfield | 272/73 |
| 4,720,789 | 1/1988 | Hector et al. | 364/410 |
| 4,771,394 | 9/1988 | Cavanagh | 364/561 |

(List continued on next page.)

FOREIGN PATENT DOCUMENTS

| | | |
|---|---|---|
| 0028209 | 6/1981 | European Pat. Off. . |
| 0354785 | 2/1990 | European Pat. Off. . |
| 9216659.8 | 7/1992 | Germany . |
| 2194369 | 3/1988 | United Kingdom . |
| WO/87/00066 | 1/1987 | WIPO . |

OTHER PUBLICATIONS

International Search Report (4 pages) for related case PCT/US94/01247.
Citation; Virtual Reality Gallery at SIGGRAPH'1991 1 page.
"DIS and Virtual Reality Networking with VR–Link", Virtual Reality World, Mar./Apr. 1994, page 8.

Primary Examiner—Richard J. Apley
Assistant Examiner—Glenn E. Richman
Attorney, Agent, or Firm—Testa, Hurwitz & Thibeault

[57] ABSTRACT

An interactive exercise apparatus engages a user's mind and body. The apparatus comprises an exercise mechanism and a steering mechanism for manipulation by the user to achieve exercise and to indicate a direction of motion. A simulated environment is generated by a computer and displayed on a display system for the user. The user manipulates the exercise mechanism and the steering mechanism to freely navigate through the simulated environment. The computer monitors the exercise mechanism and the steering mechanism to determine user position in the simulated environment. The display is periodically updated by the computer to provide a continuous visual display of the user's position as the user travels through the simulated environment. A plurality of the interactive exercise apparatus can be networked together to allow group participation in the simulated environment.

24 Claims, 12 Drawing Sheets

U.S. PATENT DOCUMENTS

| | | | |
|---|---|---|---|
| 4,786,049 | 11/1988 | Lautenschlager | 272/73 |
| 4,817,938 | 4/1989 | Nakao et al. | |
| 4,817,939 | 4/1989 | Augspurger et al. | |
| 4,860,763 | 8/1989 | Schminke | 128/707 |
| 4,887,966 | 12/1989 | Gellermann | 434/45 |
| 4,887,967 | 12/1989 | Letovsky et al. | 434/61 |
| 4,891,748 | 1/1990 | Mann | 364/410 |
| 4,919,416 | 4/1990 | De Cloux | 482/53 |
| 4,925,183 | 5/1990 | Kim | 272/73 |
| 4,932,651 | 6/1990 | Defaux | 272/73 |
| 4,938,475 | 7/1990 | Sargeant et al. | 272/73 |
| 5,031,900 | 7/1991 | Leask | |
| 5,031,901 | 7/1991 | Saarinen | |
| 5,031,902 | 7/1991 | Findlay | |
| 5,051,638 | 9/1991 | Pyles | |
| 5,072,929 | 12/1991 | Peterson et al. | |
| 5,213,555 | 5/1993 | Hood et al. | 482/57 |
| 5,240,417 | 8/1993 | Smithson et al. | 434/61 |

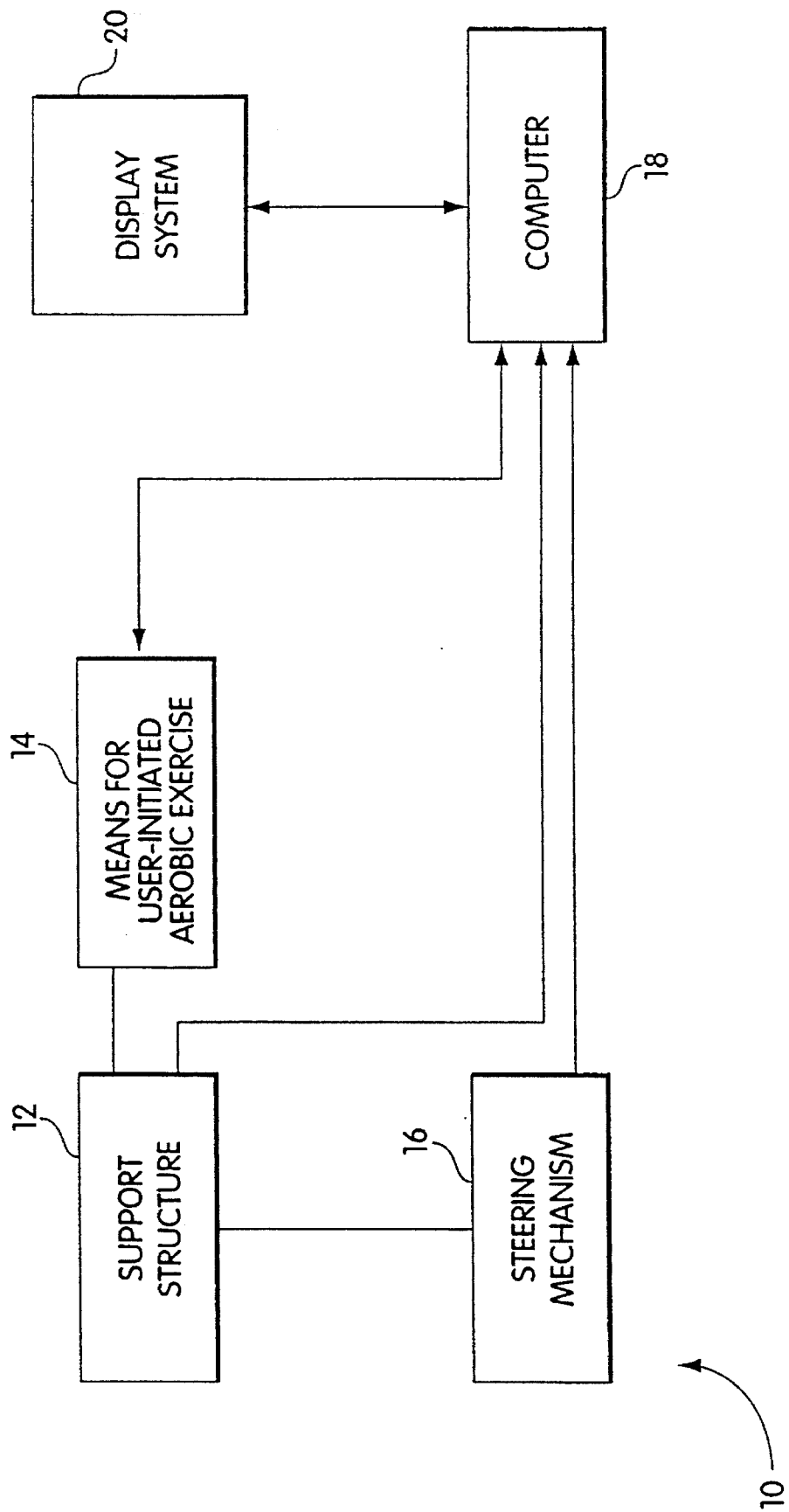

INTERACTIVE EXERCISE APPARATUS

CROSS-REFERENCE TO RELATED APPLICATION

This is a continuation-in-part of U.S. patent application Ser. No. 08/012,305 which was filed on Feb. 2, 1993, abandoned.

FIELD OF THE INVENTION

This invention relates generally to exercise equipment and networkable exercise equipment.

BACKGROUND OF THE INVENTION

It is known that physical fitness is of prime importance to many people. Historically, people have been able to maintain an acceptable level of fitness simply due to their everyday lives. As lifestyles have become progressively more sedentary, people have been forced to seek exercise in other ways.

A portion of society keeps in shape by participating in group exercise events such as tennis, hockey, or basketball games. Such games are forms of "fun exercise" in that participants often take part in such events because they simply enjoy the games or the competition and not solely for the purpose of fitness. However, it is often difficult to coordinate the people and facilities required for many recreational and team sports. Individual sports such as bicycling, running and swimming are a viable alternative in that they allow for flexible schedules. The disadvantages to these sports is that they are location and weather dependent.

A large segment of society finds it easier and more convenient to go to health clubs or to use home exercise equipment to exercise. Health clubs have extended hours and a wide range of fitness equipment that allows workout schedules to be flexible and workouts to be quick. Unfortunately, current exercise equipment makes working out a chore that is tolerated due to the importance of cardiovascular (aerobic) fitness.

Exercise equipment generally falls into two categories: strength and aerobic. Strength equipment includes traditional free weights as well as machines on which the weight is not directly attached to the lifting bars. The user lifts the weights in different ways to strengthen various muscle groups. Aerobic machines improve the user's cardiovascular system and tone muscles rather than building muscles and strength. Aerobic equipment includes exercise cycles, treadmills and stair climbers. Typically, the required speed or resistance can be varied during a workout. A control panel equipped with a set of light emitting diodes (LEDs) may be provided to depict the routine as a histogram. An average workout lasts approximately 20 minutes. Biomechanical feedback such as calories burned may also be displayed on the control panel.

The most conventional ways to exercise often are not necessarily the most fun. Thus, a need exists for fun exercise equipment which makes workouts more enjoyable and entices more people to exercise.

SUMMARY OF THE INVENTION

An object of the present invention is to provide exercise equipment which makes aerobic exercise less boring and more fun. To accomplish this, the present invention utilizes digital graphics, interactive software, a mechanism for aerobic exercise, steering controls, and a display system to provide exercise equipment which is competitive, engaging and fun. The graphics, interactive software, and display engage a user mentally while the exercise and steering mechanisms engage the user physically. As such, a workout with the exercise equipment of the present invention can be as exciting as participating in team sports but with health club or home convenience.

To accomplish the above-stated object, the invention also contemplates the interconnection of two or more exercise machines via computer networking (or, more generally, via any type of analog and/or digital communication system) such that the users of the exercise machines can interact with each other as teammates or competitors in a variety of athletic events including basketball games, baseball games, football games, bicycle races, and swimming races. By networking two or more exercise machines, the users of the machines can participate in team sports at home or at the local health club.

In one aspect, the present invention is directed to an exercise apparatus comprising a support structure for supporting a user. The support structure can include a bicycle seat or a bucket seat such that the apparatus resembles an exercise cycle. An exercise mechanism, such as a pair of cycling pedals, can be initiated by the user for providing aerobic exercise. A steering mechanism, such as a pair of handles, is disposed proximate the support structure. The exercise apparatus further comprises a processor which generates an interactive simulated environment and a display system spaced from the user providing a visual display of the simulated environment.

During a workout, the user manipulates the exercise mechanism and the steering mechanism to freely navigate through the simulated environment. The processor monitors the exercise mechanism and the steering mechanism to determine user position in the simulated environment. The display is updated by the processor to provide a continuous visual display of the user's position as the user navigates substantially unrestricted through the simulated environment.

The processor is capable of running many different programs to provide a variety of simulated environments. Some programs provide roads, terrain, and obstacles for the user and the user's competition. Other programs may provide new worlds for the user to explore or even allow the user to travel across the solar system. Each program provides a simulated environment which can be multi-dimensional to appear more realistic. The user views the simulated environment or world through the display system. The user freely navigates through the environment using the exercise mechanism and the steering mechanism. In other words, user travel in the simulated environment is substantially unrestricted. Thus, the user can travel across roads and trails or choose to travel across grass, water, or other more challenging terrain.

A user operating the exercise apparatus of the present invention manipulates the exercise mechanism and steering mechanism. The exercise mechanism may comprise a pair of interconnected cycling pedals. Further, instead of employing a traditional flywheel and freewheel to provide for pedal resistance, a closed loop digital control system may be used to electronically control pedaling revolutions. The control system includes a digital controller which controls a pedal resistance device electronically, thereby emulating a flywheel/freewheel to provide the proper combination of pedal resistance and inertia for smooth pedaling revolutions.

The steering mechanism may be coupled to a stationary base by a mechanical linkage. As the user manipulates the steering mechanism, the mechanical linkage causes tilting of the user relative to the base. This feature simulates the turning action of a bicycle or the like, serving to further engage the user in the exercising experience. In fact, the frame can tilt up to 15 degrees or more to either side of a longitudinal vertical plane.

In another aspect of the invention, the processor of an exercise apparatus is part of a computer which is networkable to computers of other exercise apparatus. When two or more of these exercise apparatus are interconnected, they can communicate and exchange information to allow the users to engage in simulated sporting events as teammates or competitors.

Other objects, aspects, features, and advantages of the invention will become apparent from the following description and from the claims.

BRIEF DESCRIPTION OF THE DRAWINGS

In the drawings, like reference characters generally refer to the same parts throughout the different views. Also, the drawings are not necessarily to scale, emphasis instead being placed on illustrating the principles of the invention.

FIG. 1 is a block diagram of an interactive exercise apparatus illustrating the principles of the present invention.

DESCRIPTION

Figure 2A:
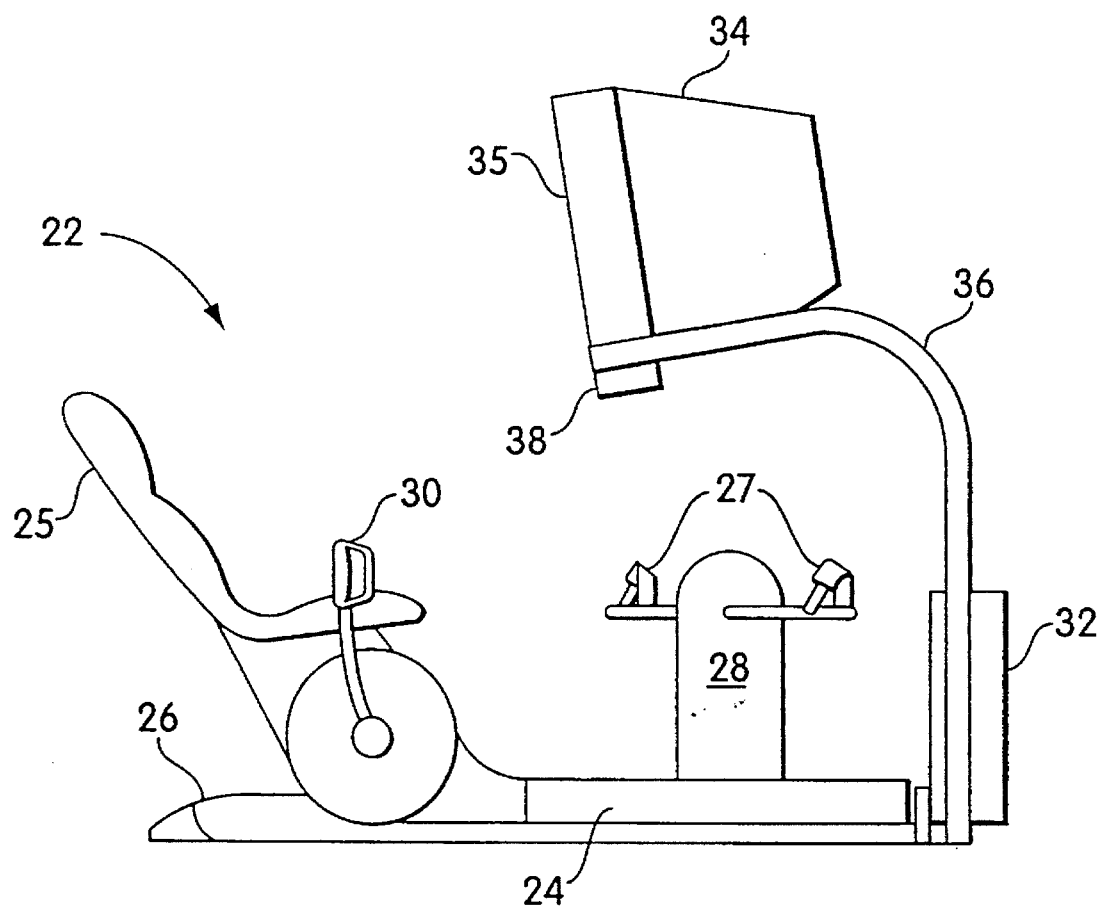
FIG. 2A is a side view of an interactive exercise cycle of the present invention.

The present invention is generally directed to interactive exercise equipment which engages a user's mind and body.

Referring to FIG. 1, an exercise device 10 comprises a support structure 12 for supporting a user. The support structure 12 may include a bicycle seat or bucket seat. An exercise mechanism 14 for providing aerobic exercise to a user, such as cycling pedals, is disposed proximate the support structure 12. A steering mechanism 16, such as handles or handlebars, is also positioned near the support structure 12.

An interactive simulated environment is generated by a processor 18, such as a computer, and displayed on a display system 20. The display system comprises a viewing screen or multiple viewing screens to provide a wider field of view. The user manipulates the exercise mechanism 14 and/or the steering mechanism 16 to freely navigate through the environment displayed on the display. To accomplish this, the processor 18 monitors the exercise mechanism 14 and the steering mechanism 16 to determine user position in the simulated environment. The processor 18 controls the level of difficulty of the exercise mechanism 14 to simulate characteristics (i.e. topography, terrain, etc.) of the environment. The display 20 is periodically updated by the computer 18 to provide a continuous visual display of the user's position as the user travels substantially unrestricted in the simulated environment.

In one embodiment, the present invention is directed to an exercise cycling apparatus as shown in FIG. 2A. The apparatus 22 includes a frame 24 movably mounted to a stationary base 26. A bucket seat 25 is mounted to the frame 24. The seat 25 enables a user to be seated in the recumbent position which provides several biomechanical and aerobic advantages. Recumbent cycling engages the gluteus maximus, the largest muscle group, to provide for maximum aerobic activity before reaching the anaerobic threshold. The bucket seat 25 makes the recumbent position very comfortable for long rides. In addition, the recumbent position is less intimidating to overweight users. It is noted, however, that the present invention can employ the more common upright exercise bicycle frame and seat without departing from the scope of the invention.

A pair of cycling pedals 27 extend from a pedal resistance device 28. The pedal resistance device 28 is adjustable so that the pedals 27 can always be within reach of a short or long-legged user. A user exercises by manipulating the pedals 27. Two vertically oriented handles 30 are coupled by a mechanical linkage 72 (see FIG. 5) to the frame 24 for steering the cycle 22. The handles 30 are positioned so that one handle is located on each side the seat 25. As the user manipulates the handles 24, the mechanical linkage cause tilting of the frame 24 relative to the base 26. This feature simulates the turning action of a bicycle and is explained in detail below.

A computer 32 capable of generating an interactive simulated environment is mounted to an L-shaped leg 36 which extends from the stationary base 26. The computer 32 can be powered by many different types of microprocessors. One embodiment of the invention includes a personal computer based on the Intel 486 microprocessor. Other computers, such as those based on the Motorola 68040 processor can be used. Regardless of the type of microprocessor employed, the computer typically also includes one or more electronic storage devices for storing one or more databases which describe the simulated environment(s). The storage devices can include CD-ROMs, hard disk drives, floppy disk drives, read only memories (ROMs), or random access memories (RAMs). At run time, the microprocessor reads the appropriate data from the database and constructs the desired simulated environment.

A viewing screen, such as a television monitor 35, is positioned opposite the seat 25 and oriented to be viewed by a seated user. The monitor 35 may be capable of showing computer generated graphics as well as standard TV and VCR images. The monitor 35 is connected to the computer 32 to provide a visual (and optional audio) display of the simulated environment. While the monitor 35 can be any size, a larger monitor is preferred. A variable speed fan 38 is mounted adjacent to the monitor 35. The computer 32 regulates the speed of the fan 38 to provide an air flow which simulates wind speed.

Figure 2B:
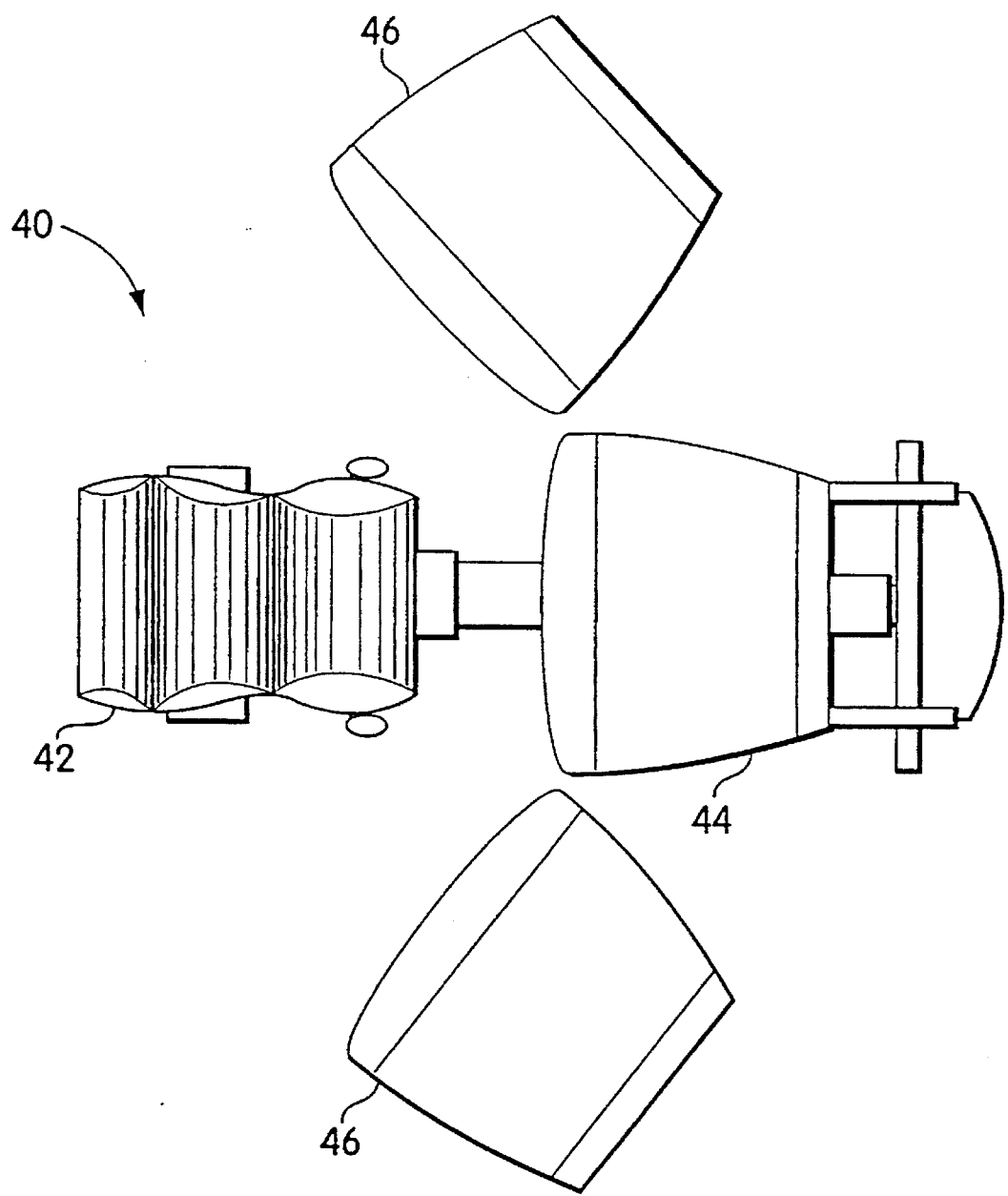
FIG. 2B is a top view of an alternative interactive exercise cycle which includes a plurality of visual display units.

Referring to FIG. 2B, a central viewing monitor 44 and two side monitors 46 can be employed. The two side monitors 46 provide peripheral vision which enhances the user's sense of motion. The side monitors may also be employed for biomechanical data and/or status displays.

Referring back to FIG. 2A, a user operates the apparatus 22 by pedaling the cycling pedals 27 and steering with the handles 30 to freely navigate through the simulated environment. The computer 32 can vary the pedal resistance felt by the user by controlling the pedal resistance device 28. The computer 32 monitors pedal speed and steering direction to determine the user's position in the simulated environment. Based on the user's action, the computer 32 provides the monitor 35 with updated views of the simulated environment which corresponds to the user's position. The monitor 35 provides the user with an ongoing visual display of the simulated environment based on the user's position therein as the user freely navigates in the environment.

The computer 32 is capable of running many different interactive programs to provide a variety of environments. Some programs provide roads, terrain, and obstacles for the user. Other programs include underwater adventure, pedal powered flight simulators, and space travel. Each program provides a simulated environment which the user views through the television monitor 35. The user freely navigates in the environment using the pedals 27 and the steering handles 30. In other words, user travel in the simulated environment is substantially unrestricted. Thus, the user can travel across roads and trails or chose to travel across grass and water as well as other more challenging terrain.

Many existing exercise machines and video games have a start-up sequence which requires a user to enter certain facts, such as weight, skill level, desired course and length of workout. The information is usually gathered through a set of buttons with LED indicators. However, this type of interrogation can be confusing and time-consuming. Accordingly, the cycling apparatus 22 may gather some of this type of information indirectly. For example, a sensing device (69 in FIG. 5) can be incorporated into the seat 25 for automatically weighing a user. Other information may be gathered by means of the user navigating the cycle down the path of choice. For example, a person who desires a tough workout could head for a hilly path. Other choices may be indicated by road signs or other markers. By using this navigational metaphor, the user is able to make choices in a natural and intuitive manner. If the user misses a choice he or she can simply turn around.

The computer 32 may be adapted to participate in a communication network connecting several exercise devices. As such, multiple users can exercise in the same simulated environment. This feature stimulates impromptu races and competition among users. By allowing users to navigate freely around the same environment, they can engage in friendly touring or fierce competition on a spur of the moment basis. This network feature is described in more detail below with reference to FIGS. 7–13.

Figure 3:
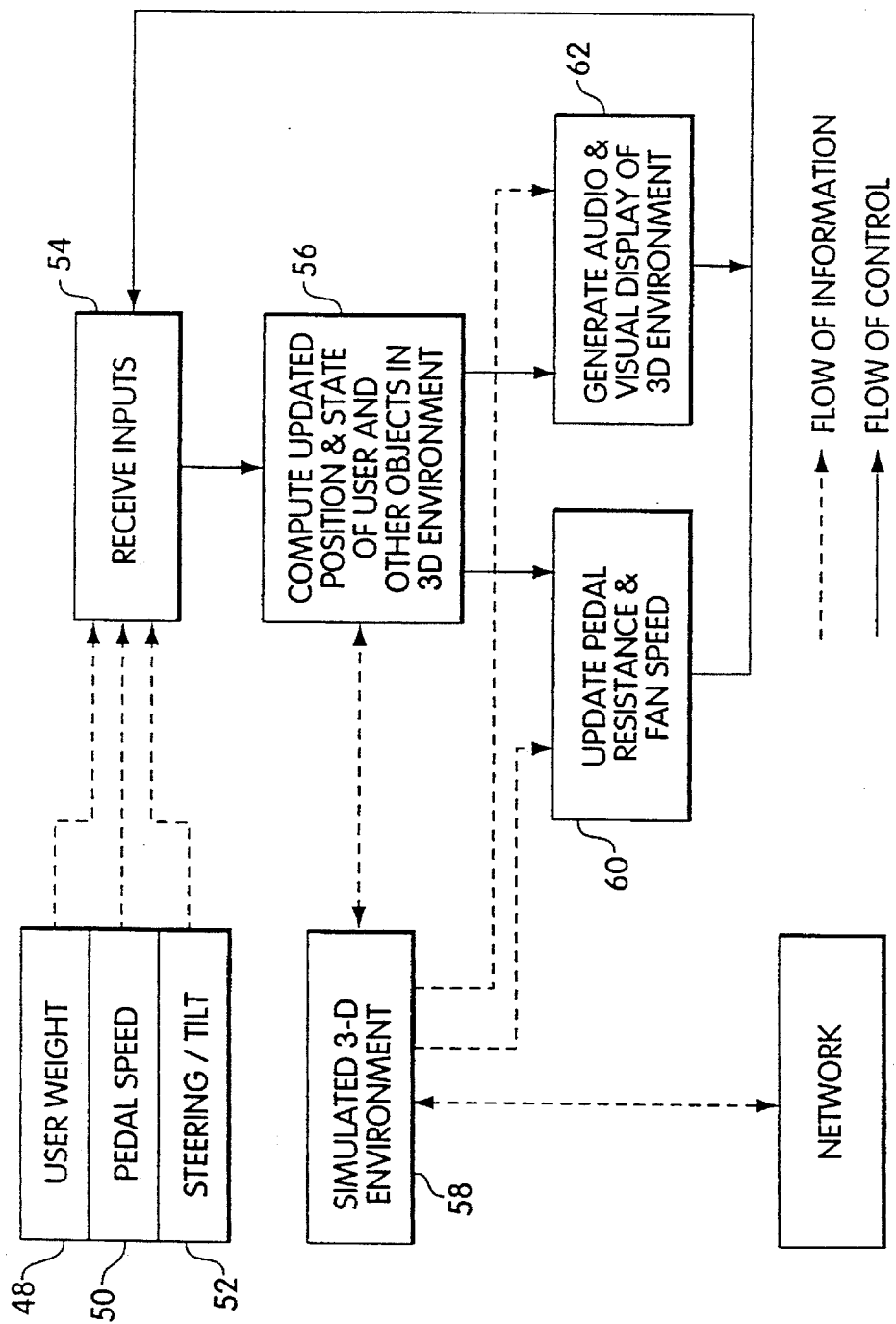
FIG. 3 is a flow chart illustrating one process for determining a user's position as the user freely navigates through a simulated environment.
Figure 10:
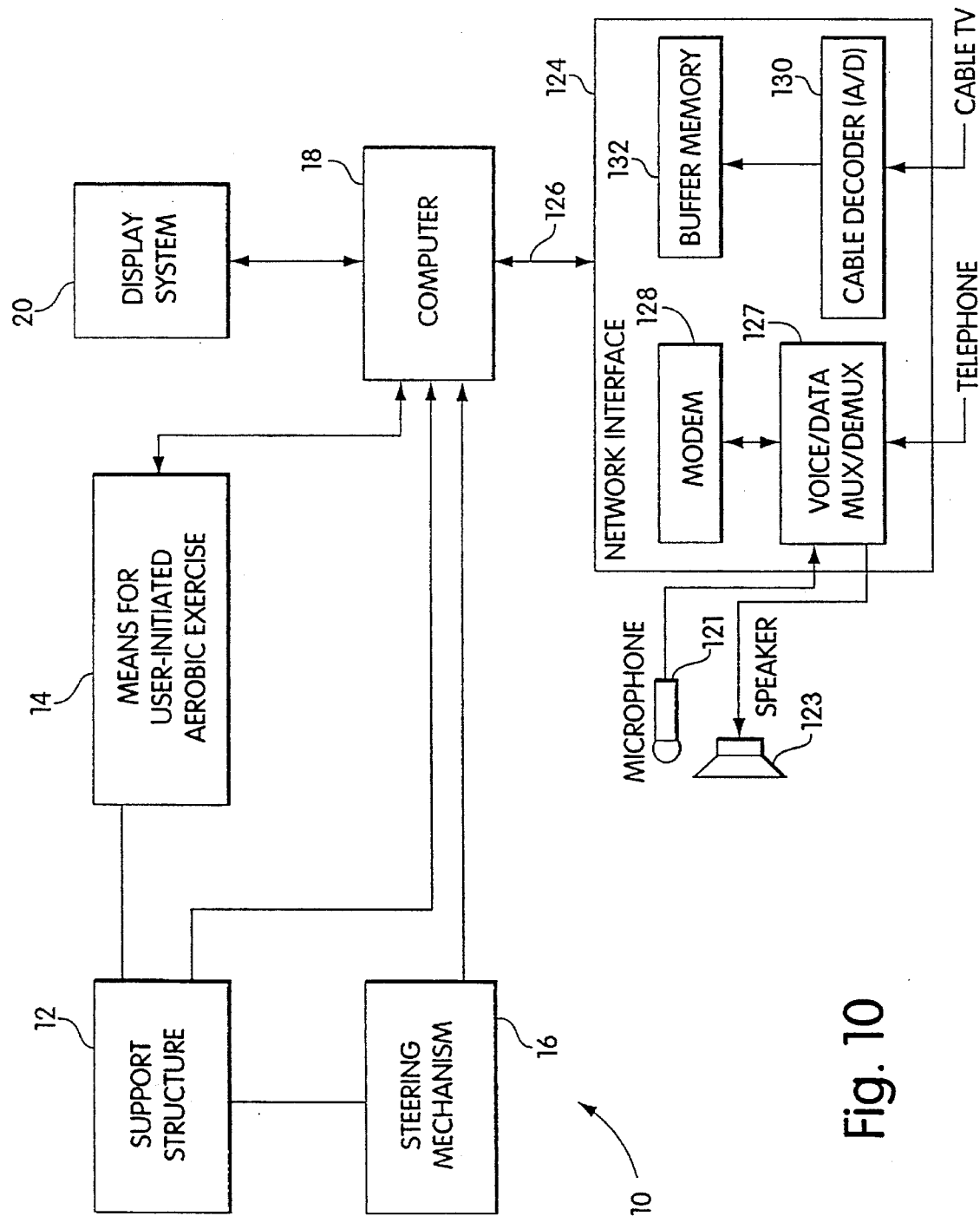
FIG. 10 is a block diagram of the interactive exercise apparatus of FIG. 1 with a network interface.

A general process flow sequence of the interactive software within the computer 32 is shown in FIG. 3. Once a particular environment has been selected, the computer monitors a variety of parameters including user weight 48, pedal speed 50, and steering/tilt 52 (step 54). The computer uses these parameters to update the user's position and direction in the environment (step 56). Subsequently, the computer generates a visual (and optionally audio) image of the environment based on the updated position of the user (step 62). The monitor 35 displays updated images at least 7 times/second. The computer 32 updates pedal resistance to simulate such elements as hills, gear changes, road surfaces, simulated headwinds, and drafting of opponents (step 60). The fan speed can be modulated to correspond to the simulated windspeed and speed of travel. Finally, the computer 32 may also generate sounds and background music. One or more speakers for projecting the sound can be located in/on the computer, in/on the display(s), or elsewhere in/on the exercise machine (e.g., in/on the seat near the user's head). (A microphone and a speaker are shown in FIG. 10 and described below with reference to that drawing.)

Figure 4:
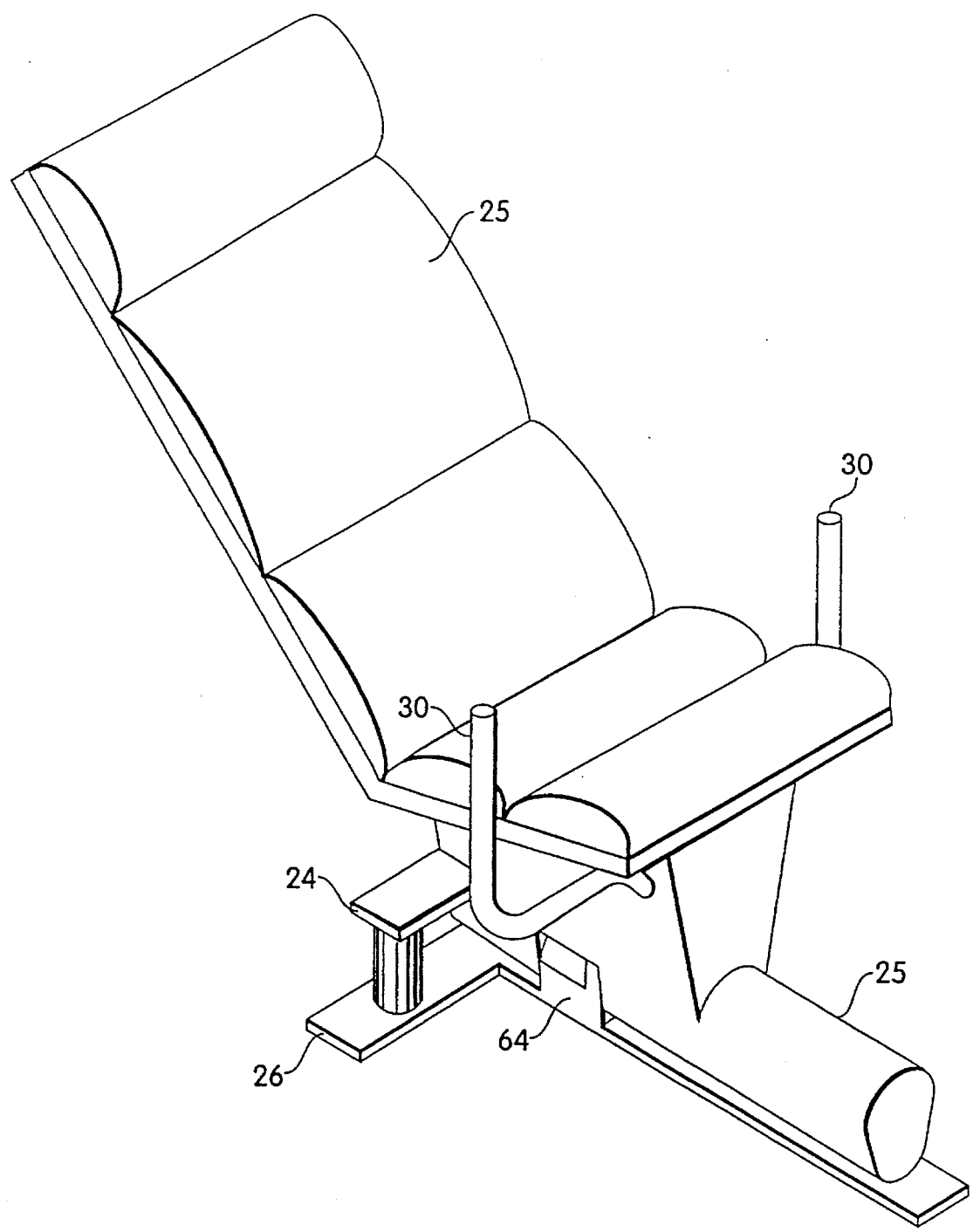
FIG. 4 is a partial perspective view of the interactive exercise cycle of FIG. 2A illustrating a frame movably mounted on a stationary base.

A detailed illustration of the seating portion of the exercise apparatus 22 is provided in FIG. 4. The seat 25 upon which the user sits is mounted onto the frame 24. The frame 24 is movably mounted to the base 26 by hinges 64. Although only one hinge 64 is shown, it is noted that one or more hinges are used. Push button controls can be provided on the handles 30 for shifting gears and other interactive functions.

Figure 5:
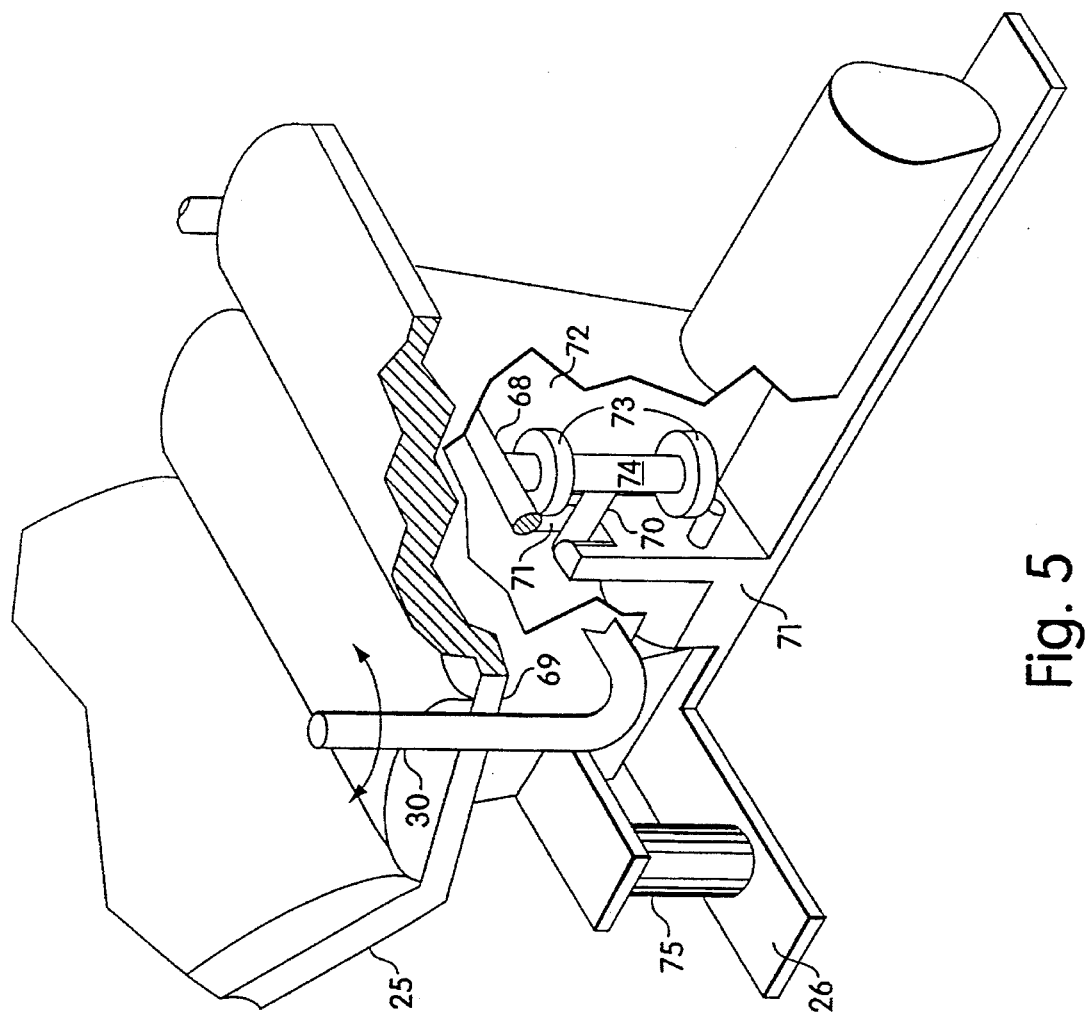
FIG. 5 is an exploded partially cut-away view of FIG. 4 illustrating a mechanical linkage connecting the steering mechanism to the base.

Referring to FIG. 5, a mechanical linkage 72 allows the frame 24 to tilt relative to the base (up to 15 degrees or more to either side of the longitudinal vertical plane) in response to manipulation of the handles 30 for simulating the turning action of a bicycle. The handles 30 are connected to the mechanical linkage 72 by a beam 68. The mechanical linkage 72 includes a horizontal beam 70 positioned between a pair of vertical posts 71. The posts 71 extend from the stationary base 26. The mechanical linkage also includes bearings 73 mounted in the frame 24 and holding a pivoting vertical post 74.

As the user manipulates the handles 30 back and forth (as indicated by the arrows) to steer in the simulated environment, the beam 68 turns causing the vertical and horizontal posts (74, 70) to move in the same direction laterally. The horizontal post 70 contacts the vertical post 71 which pushes the frame 24 in the opposite direction. This causes frame 24 to tilt about the hinge 64 causing the seat 25 and the pedals 27 to tilt accordingly.

A pair of springs 75 are positioned on opposite sides of the seat 25. The springs 75 are disposed between the frame 24 and the base 26 for centering the frame 24 once the user lets up on the handles 30 or gets off the seat 25. As such, the springs 75 serve as a self-centering mechanism to ensure that the seat 25 is vertically aligned for easy mounting and dismounting.

A sensing device 69 located under the seat 25 measures the user's weight and adjusts the stiffness of the self-centering springs 75. The springs 75 are adjusted to stiffer settings for heavier persons and less stiff settings for lighter persons. As such, each user can experience the full range of tilting motion.

Additional sensors may be employed in and around the seat 25 to noninvasively monitor, for example, the user's heart rate, pedal speed, and power output. For example, the sensing device 69 provides an estimate of the user's body weight. These inputs are used by the computer software to determine the caloric output of the user.

It is noted that the apparatus of the present invention can employ a traditional freewheel and flywheel to provide pedaling resistance. However, a closed loop digital control system may be employed instead. As such, pedaling resistance would be provided by a simpler drive mechanism controlled electronically by a digital control system to provide for smooth pedaling strokes.

Figure 6:
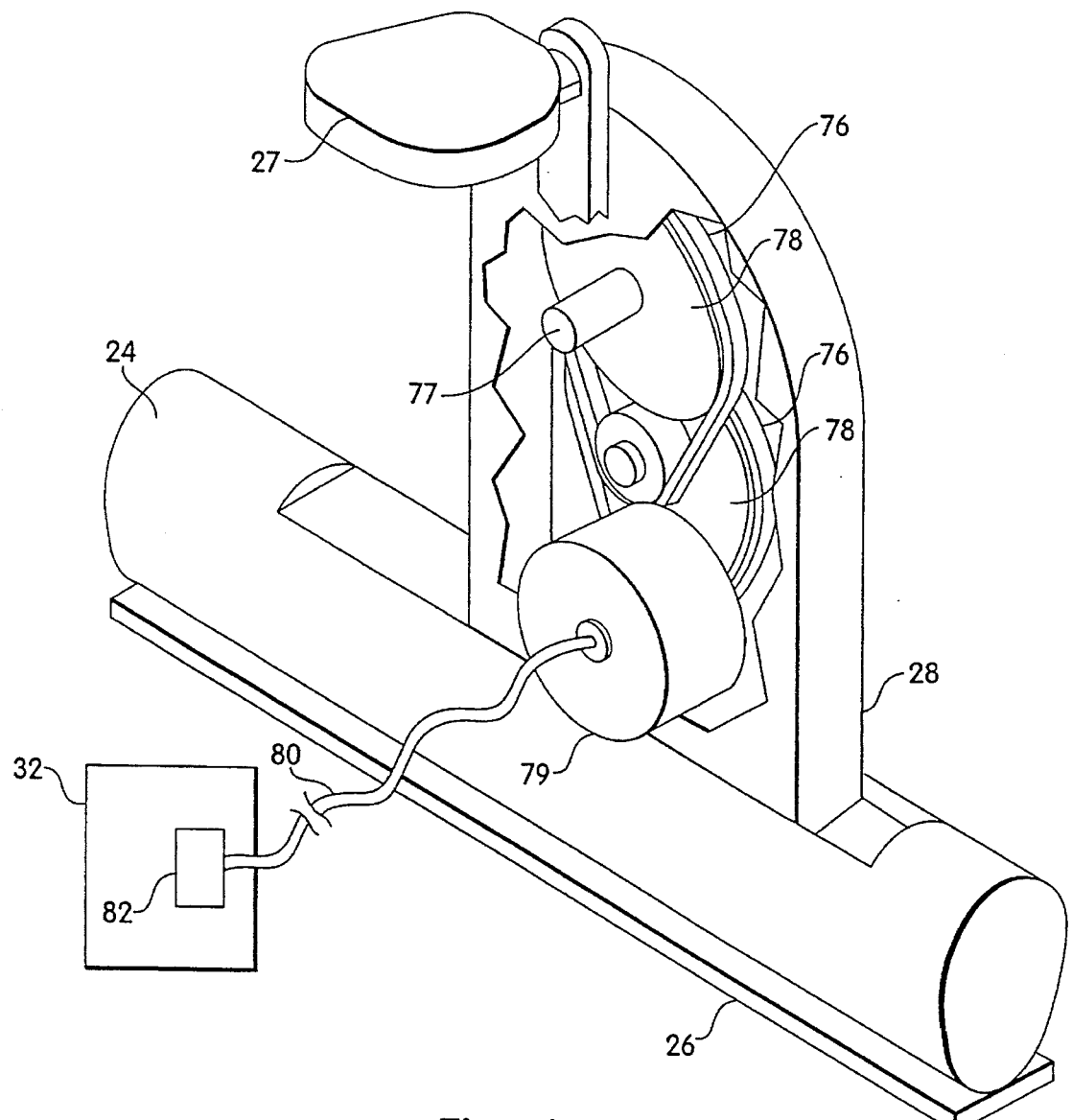
FIG. 6 is a cross-section view of a pedal resistance device used in the interactive exercise cycle of FIG. 2A.

Referring to FIG. 6, the cycling pedals 27 are connected to the pedal resistance device 28. The device 28 is adjustable to accommodate users having short and long legs. The pedals 27 turn an axle 77. The axle 77 is coupled to a braking device 79 by a plurality of belts 76 and pulleys 78. The braking device 79 can include any of the following mechanisms: a magnetic particle brake, hysteresis brake, mechanical straps and pads, electrical generators, torque motors or magnetic inductance. In one embodiment, a hysteresis brake is used (such as Model HB produced by Magtrol, Inc. of Buffalo, N.Y.) providing a smaller, simpler means of providing the resistance to the pedals.

The digital control system 82 is connected to the brake 79 by wires 80. Responsive to the interactive software in the computer 32, the control system 82 controls the pedal resistance of the braking device 79 electronically, thereby emulating the traditional flywheel/freewheel arrangement to provide the proper combination of pedal resistance and inertia for smooth pedaling revolutions. For example, an extremely light resistance is provided to simulate downhill travel and higher resistance is provided to simulate gear changes, wind resistance, and hills. The pedals can be driven backwards to reverse direction.

As mentioned previously with reference to FIG. 3, the computer (18 in FIG. 1, 32 in FIG. 2A) can be interconnected with computers of one or more other exercise apparatus via a network interface module. With two or more of these exercise apparatus networked together, the computers can communicate and share information and allow the users to navigate freely in the same simulated environment and to interact as teammates or competitors.

Figure 7:
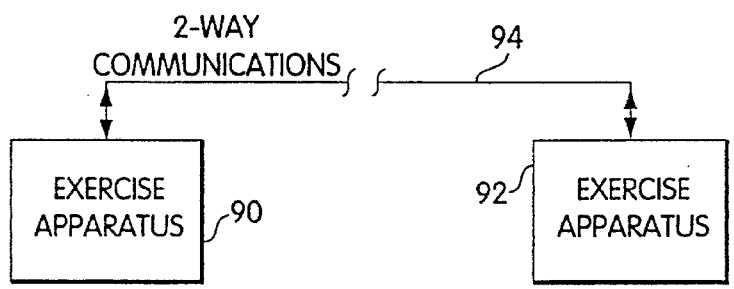
FIG. 7 is a block diagram of an exercise apparatus-to-exercise apparatus network according to the invention.

Referring to FIG. 7, a computer of a first exercise apparatus 90 is interconnected to a computer of a second exercise apparatus 92 via a two-way communication link 94. While only two exercise apparatus are shown in FIG. 7, it is possible to network more than two such machines together via the link 94. Note that while each exercise apparatus 90, 92 can be a device in accordance with the previous description which references FIGS. 1–6, each also can be any other type of exercise machine which: (i) allows a user to exercise some part of her (or his) body; (ii) allows a user to indicate a desired direction of motion (i.e., steer); and (iii) includes a computer or processor to allow interconnection and communication with other such exercise machines. In one embodiment, one (or more) of the networked exercise machines is a stair climber machine having a pipe which the user pushes and/or pulls (e.g., with his or her hands) in various directions to indicate various desired directions of motion, the machine having one or more strain gauges attached to the pipe such that the user's manipulations of the pipe are converted into signals the machine's computer can understand and/or process.

The link 94 can be any type of two-way transmission channel such as telephone lines (analog and/or digital) or direct-connecting cables. The link 94 also can be free space in the case of communication by electromagnetic wave transmission and reception. The physical distance between the first and second exercise apparatus 90, 92 can be a factor in determining the type of channel to employ for the link 94. For instance, if the two apparatus 90, 92 are located physically near each other (e.g., in the same building), the link 94 can be a coaxial or electrical cable. As another example, if the two apparatus 90, 92 are located physically away from each other (e.g., in different cities but in the same state), the link 94 can be established by telephone lines. The link 94 also can, in some embodiments, represent generally a computer network (e.g., a token ring network, an Ethernet network, etc.) on which two or more exercise apparatus exchange information.

Regardless of the physical distance between the two (or more) networked exercise apparatus, the network connection allows the users to exercise in the same simulated environment. The computer in each exercise apparatus (not shown in FIG. 7) controls the communications between apparatus. The computers exchange various parameters (such as user weight 48, pedal speed 50, and steering/tilt 52 as indicated in FIG. 3) so that each computer can display to its user the position and direction of the other users in the environment. In general, the communications between the networked computers allow each user to interact with the other users.

In the simulated environment, each user can be depicted with a unique (three-dimensional) icon, picture, or other symbol. During the simulation, the same environment database is stored and executed on each machine. Each computer is responsible for updating the environment so that its user sees herself (or himself) in relation to all other networked users. The desired simulation typically is selected by agreement of all interested users on the network prior to the start of the group simulation. After selection, that environment's database is transferred between computers (over the link 94) so that each computer can execute the same environment and participate in the group simulation. Typically, each computer has a permanent copy of the selected simulation environment stored therein and thus does not need to receive it over the link 94. Mechanisms to allow networked users to join an already-begun group simulation can be provided.

In addition to sharing position, direction, etc. parameters, the networked computers can share voice information. While a microphone is not shown in FIG. 7, it should be understood that a microphone can be electrically coupled to the computer and located in/on the computer, in/on the display(s), or elsewhere in/on the exercise machine (e.g., in/on the seat near the user's head). (A microphone and a speaker are shown in FIG. 10 and described below with reference to that drawing.) If the link 94 is established with telephone lines, the phone signal can be multiplexed to allow for both voice and data communication between the users. This dual use of the phone signal is possible due to the relatively low-bandwidth of communication required for the shared parameters (e.g., position, direction). By allowing voice communication, the users can talk in real-time while, for example, racing pedal-powered chariots though ancient Rome.

The communication interconnections described above with reference to FIG. 7 can be referred to as "local networking" or "person-to-person networking" in that each computer of each exercise apparatus on the network can communicate directly with any other computer of any other exercise apparatus on the network. In contrast to the network of FIG. 7 is the "large-scale direct network" of FIG. 8 in which two or more exercise apparatus (four are shown in the disclosed embodiment, namely 96, 98, 100, 102) communicate through a central hub processor 104. Each exercise apparatus 96, 98, 100, 102 is coupled to the hub 104 by a two-way communication link 106, 108, 110, 112 which each can be any of a variety of two-way links as described above with reference to FIG. 7. The hub 104 is responsible for limiting the information directed to each apparatus in the large-scale direct network of FIG. 8. The hub 104 can ensure, for example, that each apparatus only gets (parameter) updates about other users in the same general area of the simulated environment.

Figure 8:
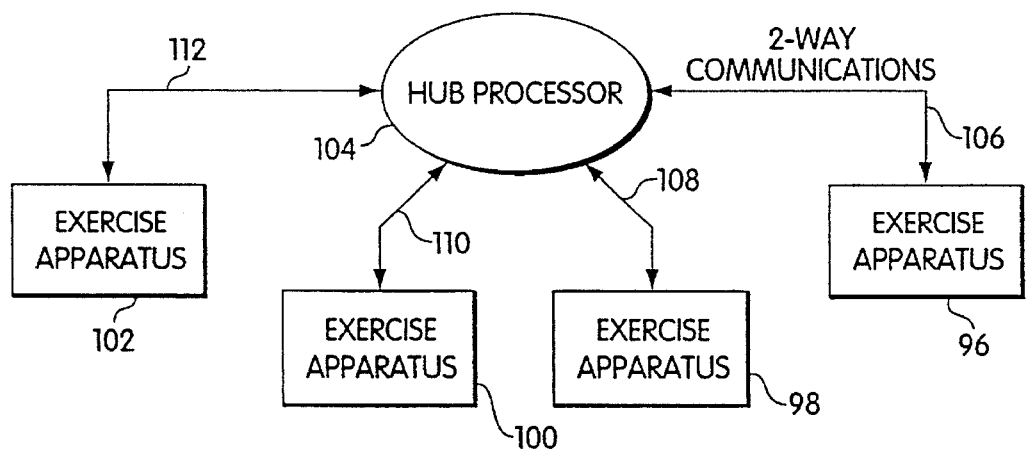
FIG. 8 is a block diagram of a network in which a hub controls communications between two or more exercise apparatus ("nodes") by receiving information from all nodes and directing information to all of, or to a subset of all of, the nodes.
Figure 9:
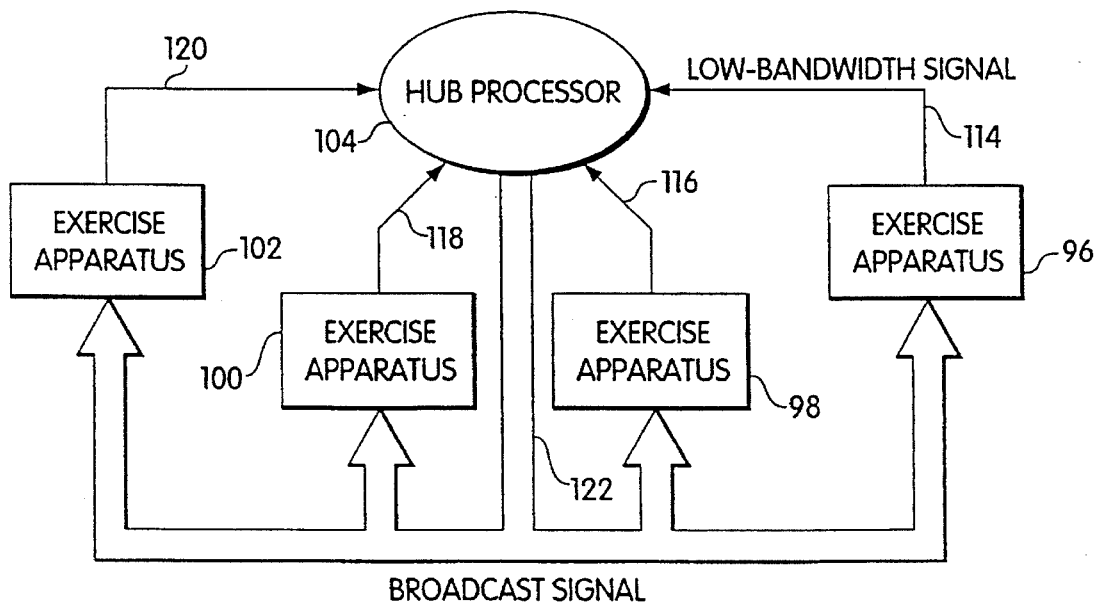
FIG. 9 is a block diagram of a network in which a hub receives information from all network nodes and broadcasts information to all nodes.

Referring to FIG. 9, a "large-scale broadcast network" is shown which is similar to the network of FIG. 8 except that the large-scale broadcast network of FIG. 9 includes two or more exercise apparatus (four are shown) which each (i) send information to the central hub processor 104 over a low-bandwidth line 114, 116, 118, 120 and (ii) receive broadcasts from the hub 104 over a high-bandwidth line 122. Although the low-bandwidth lines are used primarily to send information to the central hub processor, one or more of these lines can be bi-directional lines such as telephone lines. An exercise apparatus connected to the central hub processor by a bi-directional line can receive information from both its high-bandwidth and low-bandwidth lines. In one disclosed embodiment, the high-bandwidth line 122 is a cable TV channel and the low-bandwidth lines 114, 116, 118, 120 are telephone lines or interactive cable TV lines.

In the large-scale broadcast network configuration of FIG. 9, each exercise apparatus 96, 98, 100, 102 listens to all data broadcast by the hub 104 but generally pays attention only to that data which has a bearing on it. The hub 104 preferably groups messages by regions of the simulated environment to facilitate this selective receipt of broadcast data by the exercise apparatus 96, 98, 100, 102. For instance, when the hub receives data transmitted from the user's computer over the low-bandwidth channel, the hub receives the data from all of the concurrent users, processes it in real-time to resolve all collisions and conflicts, groups users in a specific region of the simulated environment into the same group, and then broadcasts the grouped information (e.g., updated position information) over the high-bandwidth channel. The computers in a particular group only listen to information about their group, and they only display information about users in the same general area (i.e., in the same group).

The high-bandwidth channel of FIG. 9 can be used to broadcast the content of the simulation environment database to everyone on the network. If a cable TV channel is employed as the high-bandwidth channel, an entire simulation database can be broadcast in about one to three seconds. By continuously broadcasting one environment after another over a cable TV channel, a hub could provide from 50 to 100 choices, for example, to connected users with virtually no waiting.

Regardless of whether the network is configured as in FIG. 7, FIG. 8, or FIG. 9, the users on the network can be provided with a variety of simulation environment selections (e.g., by menus displayed to them). A wide range of exercise environments could be offered such as environments geared towards competition, education, or the future. In addition, the network could allow users to customize their own virtual environments. This could be done by providing each computer with software capable of modifying existing environments or capable of building new environments from a set of fundamental "blocks" provided to the user. These custom environments could then be shared with others on the network. Also, the network could allow each user to select and/or customize her (or his) icon or symbol which all other users will see on their respective displays. Icon selection can be accomplished by: (i) the central hub presenting each user with a pre-set menu from which the user selects his persona; (ii) the central hub allowing limited editing or customizing of the figures; (iii) software allowing users to build their own icon on their respective computer; or (iv) distributing packaged software with a set of pre-prepared persona.

For these networked systems, the sporting applications are tremendous. Races and events could be set-up to allow competition between users physically spread across the globe. In one scenario, a new race environment is designed each week. During the week, users download the course and take training rides to learn the course and plan their strategy. While training they see other athletes and may engage in impromptu competitions. The big race is at a predetermined time. All of those who are interested tune-in and commence an all-out race for the finish. During the race you can jockey for position with other riders and keep track of the leaders. The winners might earn prizes or go on to national and international events. All without leaving your house or health club.

The action is not limited to racing or even competitive simulations. Team sports similar to soccer or football could be implemented as well as scavenger hunts, capture the flag, and other adventure games.

Whether the network configuration is as shown in FIG. 7, FIG. 8, or FIG. 9, the individual exercise apparatus which are interconnected will each have a network interface module of some sort which allows them to communicate. Referring to FIG. 10, the disclosed embodiment of the exercise apparatus 10 includes a network interface module 124 which allows communication over a relatively low-bandwidth telephone line and/or a relatively high-bandwidth cable TV line. The other components of the exercise apparatus 10 were described previously with reference to FIG. 1. Note that any of a variety of other types of exercise machines can be used instead of the apparatus 10 as described previously with reference to FIG. 7.

The computer 18 communicates with the network interface module 124 as indicated by a double-headed arrow 126. The network interface module 124 includes a telephone modem 128 for communication over relatively low-bandwidth telephone lines, and it also includes a voice and data multiplexer and demultiplexer 127 coupled to the modem 128. In the disclosed embodiment, a microphone 121 and a speaker 123 are connected to the voice/data mux/demux 127. The network interface module 124 also includes a cable TV interface for communication over relatively high-bandwidth cable TV lines. The cable TV interface includes a cable TV decoder 130 (i.e., an analog-to-digital converter) and a memory buffer 132.

Figure 11:
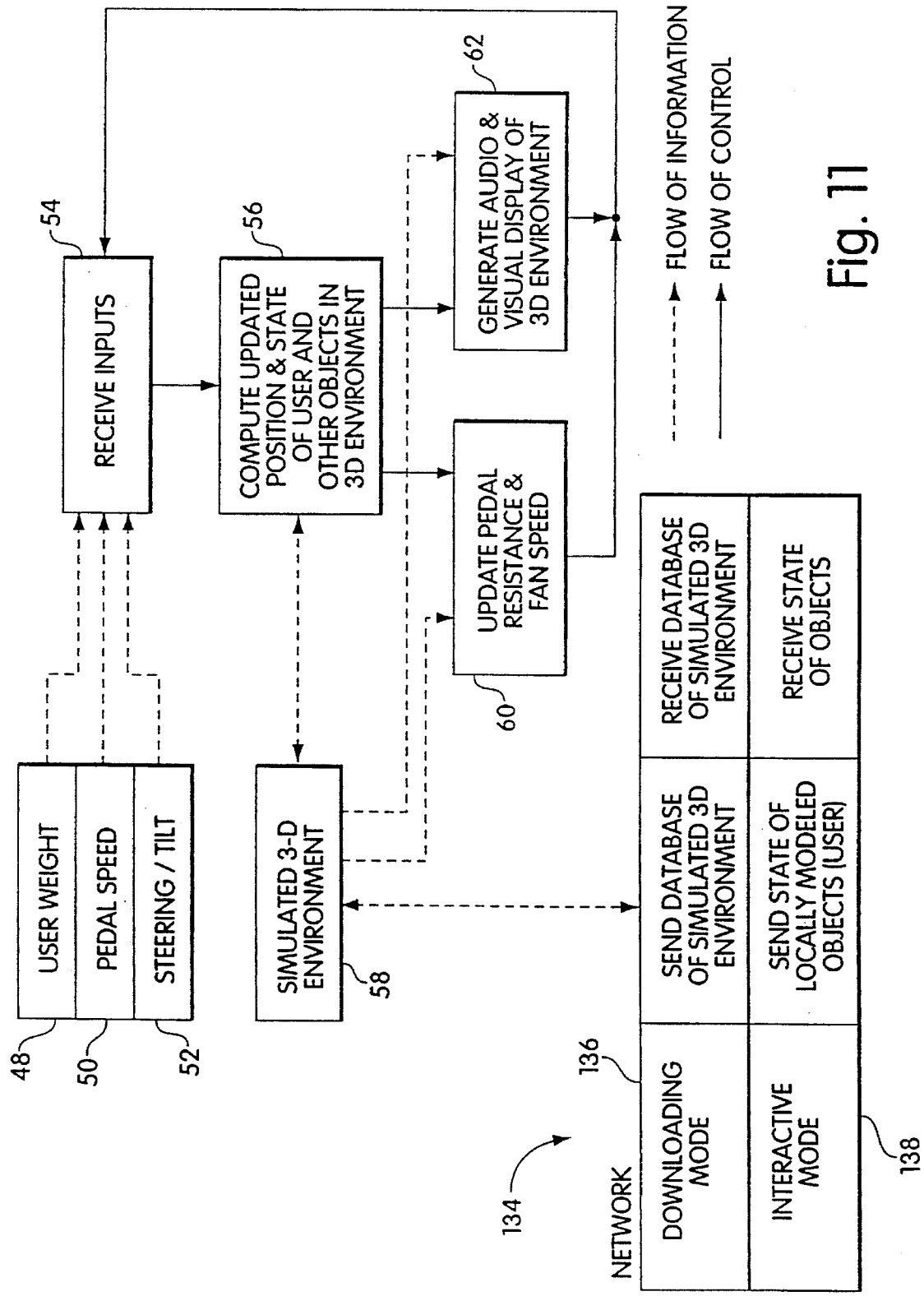
FIG. 11 is a flow chart, similar to the flow chart of FIG. 3, which illustrates a process for determining a user's position as the user freely navigates through a simulated environment.

A general process flow sequence of the interactive software which executes on the computer of each networked exercise apparatus is shown in FIG. 11. FIG. 11 is similar to FIG. 3 except that FIG. 11 is directed to an apparatus which operates in the network configuration of FIG. 7, FIG. 8, or FIG. 9. Steps which the computer takes when networked to other computers are indicated generally by the numeral 134. When the computer is in a downloading mode 136, it is either (i) transmitting a simulation environment database to other computers or to the hub, or (ii) receiving a simulation environment database from other computers or from the hub. When the computer is in an interactive mode 138, it is either (i) transmitting parameters relating to the position, direction, etc. of the user, or (ii) receiving such parameters on other users in the group simulation from their respective computers or from the hub.

Figure 12:
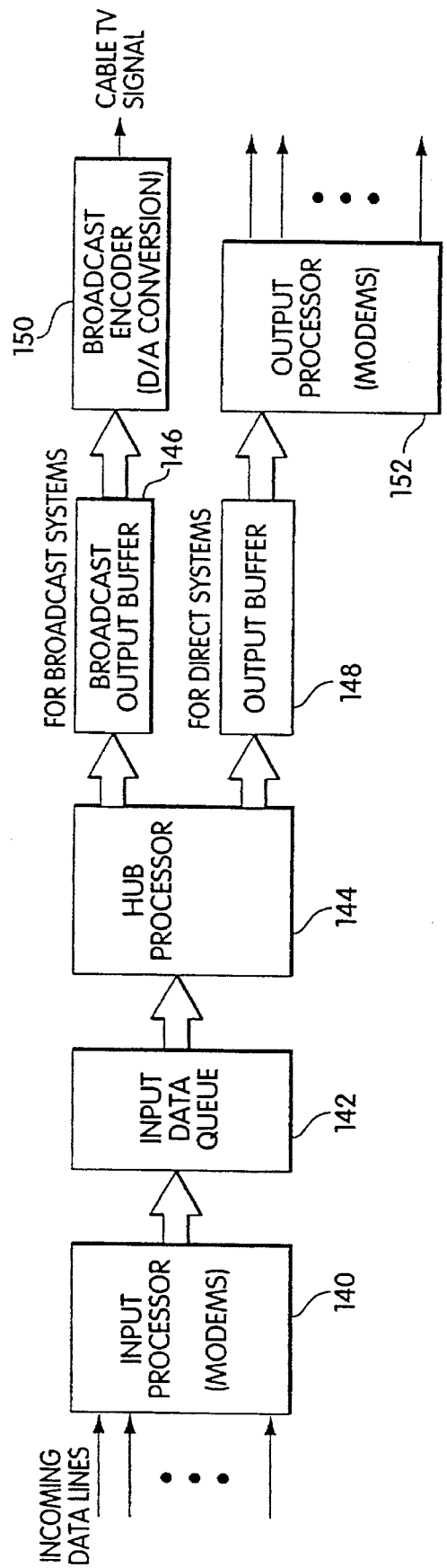
FIG. 12 is a block diagram of the hub of FIG. 8 or FIG. 9.

In the disclosed embodiment, the central hub processor of FIGS. 8 and 9 includes an input processor 140 which receives data from the networked exercise machines, as shown in FIG. 12. In general, the input processor 140 includes one modem for each networked machines, and in this disclosed embodiment, each modem is a telephone modem for receiving signals from the networked machines via the telephone lines. The hub also includes an input data queue 142 which is fed by the input processor 140. The queue 142 holds data for the processor 144 which can be a microprocessor such as those manufactured and sold by Intel, Motorola, or any number of other suppliers. The remainder of FIG. 12 shows two embodiments. The top data stream in FIG. 12 is directed to the embodiment in which the hub is used in the large-scale broadcast network of FIG. 9. The bottom data stream in FIG. 12 is directed to the embodiment in which the hub is used in the large-scale direct network of FIG. 8. Note that the hub can include the components in both the top and bottom data streams of FIG. 12 thereby allowing the same hub to be used in either a direct or broadcast network. In both the broadcast network and the direct network, the hub includes an output buffer 146, 148. In the broadcast network, the hub further includes an encoder 150 which performs digital-to-analog conversions so analog signals can be broadcast over the cable TV channel. In the direct network, the hub further includes an output processor 152 which, like the input processor 140, includes modems for sending signals to the networked machines via the telephone lines.

Figure 13:
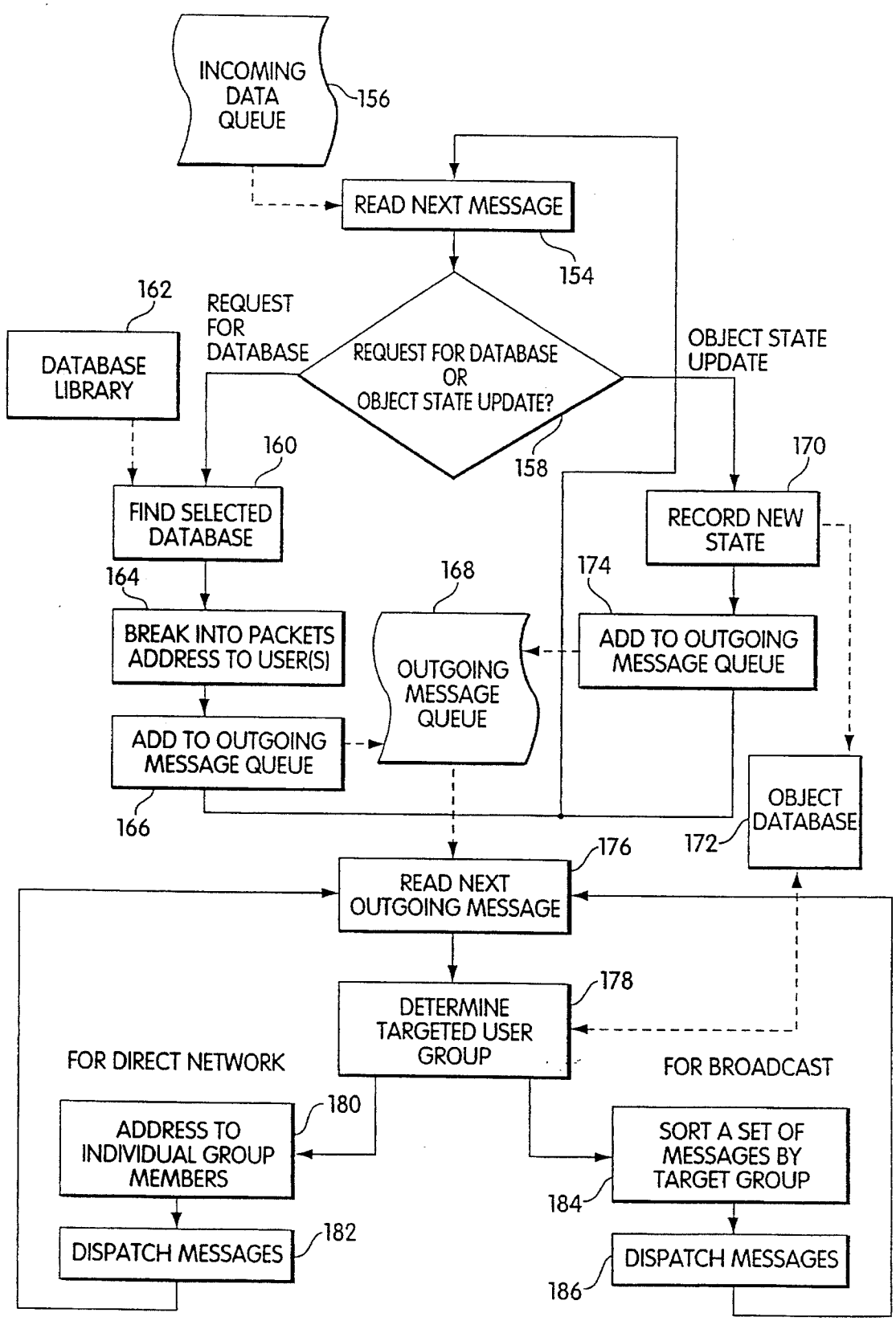
FIG. 13 is a flow chart illustrating a process for message processing in the hub of FIG. 8 or FIG. 9.

A general process flow sequence of the processes performed by the hub of FIG. 8 and the hub of FIG. 9 is shown in FIG. 13. At step 154, the hub of FIGS. 8 and 9 reads information from an incoming queue 156 (which may be the input data queue 142 of FIG. 12 or a separate list built and maintained by the processor 144 from data extracted from the queue 142) and determines at step 158 whether the incoming message is a request for a database or an update (e.g., of a particular networked user's position, direction, etc. in the simulated environment). If it is a request, the hub locates the requested database (step 160) by searching an externally or internally maintained library of databases 162. The located database is then broken into data packets and addressed to the appropriate user(s) (step 164) and the packets are added (step 166) to an outgoing message queue 168. If it is an update, the hub records the new state of the user's icon/object (step 170) by referencing an externally or internally maintained object database 172 which contains the location, etc. data on all users in the environment. The new state information is then added (step 174) to the outgoing message queue 168. Next, the hub takes messages (step 176) from the outgoing message queue 168 and determines which group of users should receive the message (step 178) by referencing the object database 172. The remaining steps the hub performs depend on whether the hub is used in the large-scale direct network of FIG. 8 or the large-scale broadcast network of FIG. 9. If in the large-scale direct network configuration, the hub addresses the outgoing message to the individual networked machines which need to receive the message (step 180). The message is then sent (step 182). If in the large-scale broadcast network configuration, the hub sorts the outgoing messages into groups (step 184) and then broadcasts to all networked machines (step 186).

Other modifications and implementations will occur to those skilled in the art without departing from the spirit and the scope of the invention as claimed. Accordingly, the invention is to be defined not by the preceding illustrative description but instead by the following claims.

What is claimed is:

1. A networkable exercise apparatus, comprising:

an exercise mechanism which a user manipulates to achieve exercise;

a steering mechanism disposed proximate the exercise mechanism which the user manipulates to indicate direction of motion;

a computer for generating a simulated environment and for monitoring user manipulation of the exercise mechanism and the steering mechanism to determine user position in the simulated environment, the computer including a network interface to allow communication over a communication channel with at least one other such exercise apparatus; and a display system spaced from the user and coupled to the computer for providing a visual display of at least the user's position in the simulated environment;

the computer being configured to enable the user to (i) travel substantially unrestricted throughout the simulated environment by manipulating the exercise mechanism and the steering mechanism, (ii) modify user's course while traveling within the simulated environment, and (iii) participate in user selectable activities within the simulated environment.

2. The networkable exercise apparatus of claim 1 wherein:

the computer transmits, via the network interface, information about the user's manipulation of the exercise mechanism and the steering mechanism to the other exercise apparatus;

the computer receives, via the network interface, information from the other exercise apparatus about its user's manipulation of its exercise and steering mechanisms;

the computer processes the transmitted and received information to determine the position of both users in the simulated environment; and the display system visually displays the position of both users in the simulated environment.

3. The networkable exercise apparatus of claim 2 further comprising microphone means coupled to the computer for receiving voice sounds uttered by the user and speaker means coupled to the computer; wherein:

the computer converts the sounds received by the microphone means into voice signals and transmits, via the network interface, the voice signals to the other exercise apparatus;

the computer receives, via the network interface, voice signals from the other exercise apparatus which is representative of its user's utterances;

the computer processes the received voice signals to generate, and broadcast through the speaker, sounds representative of the received voice signals.

4. The networkable exercise apparatus of claim 1 further comprising sensing means, disposed substantially under the user and coupled to the computer, for generating a signal representative of weight of the user bearing down on the sensing means.

5. The networkable exercise apparatus of claim 1 wherein the computer transmits, via the network interface, data representative of one or more simulated environments to the other exercise apparatus.

6. The networkable exercise apparatus of claim 1 wherein the computer receives, via the network interface, data representative of one or more simulated environments from the other exercise apparatus.

7. An exercise system, comprising:
(A) a first networkable exercise apparatus which comprises:
(a1) a first exercise mechanism which a first user manipulates to achieve exercise;
(a2) a first steering mechanism disposed proximate the first exercise mechanism which the first user manipulates to indicate direction of motion;
(a3) a first computer for generating a simulated environment and for monitoring user manipulation of the first exercise mechanism and the first steering mechanism to determine the first user's position in the simulated environment, the first computer including a first network interface to allow communication over a communication channel; and
(a4) a first display system spaced from the first user and coupled to the first computer for providing a visual display of at least the first user's position in the simulated environment;
the first computer being configured to enable the first user to (i) travel substantially unrestricted throughout the simulated environment by manipulating the first exercise and steering mechanisms, (ii) modify user's course while traveling within the simulated environment, and (iii) participate in user selectable activities within the simulated environment; and
(B) a second networkable exercise apparatus which comprises:
(b1) a second exercise mechanism which a second user manipulates to achieve exercise;
(b2) a second steering mechanism disposed proximate the second exercise mechanism which the second user manipulates to indicate direction of motion;
(b3) a second computer for generating the simulated environment and for monitoring user manipulation of the second exercise mechanism and the second steering mechanism to determine the second user's position in the simulated environment, the second computer including a second network interface to allow communication with the first computer of the first networkable exercise apparatus; and
(b4) a second display system spaced from the second user and coupled to the second computer for providing a visual display of at least the second user's position in the simulated environment;
the second computer being configured to enable the second user to (i) travel substantially. unrestricted throughout the simulated environment by manipulating the second exercise and steering mechanisms, (ii) modify user's course while traveling within the simulated environment, and (iii) participate in user selectable activities within the simulated environment.

8. The exercise system of claim 7 wherein:
the first computer transmits, via the first network interface, information about the first user's manipulation of the first exercise mechanism and the first steering mechanism to the second computer of the second networkable exercise apparatus;
the second computer,receives, via the second network interface, the information transmitted by the first computer and processes the information to determine the position of the first user in the simulated environment; and
the second display system visually displays the position of both the first user and the second user in the simulated environment.

9. The exercise system of claim 7 wherein:
the second computer transmits, via the second network interface, information about the second user's manipulation of the second exercise mechanism and the second steering mechanism to the first computer of the first networkable exercise apparatus;
the first computer receives, via the first network interface, the information transmitted by the second computer and processes the information to determine the position of the second user in the simulated environment; and
the first display system visually displays the position of both the second user and the first user in the simulated environment.

10. The exercise system of claim 7 wherein:
the first networkable exercise apparatus further comprises first microphone means coupled to the first computer for receiving voice sounds uttered by the first user and first speaker means coupled to the first computer;
the second networkable exercise apparatus further comprises second microphone means coupled to the second computer for receiving voice sounds uttered by the second user and second speaker means coupled to the second computer;
the first and second computers convert the sounds received by the first and second microphone means into voice signals and transmit, via the first and second network interfaces, the voice signals to the other networkable exercise apparatus;
the first and second computers receive, via the first and second network interfaces, the voice signals from the other networkable exercise apparatus;
the first and second computers process the received voice signals to generate, and broadcast through the first and second speakers, sounds representative of the received voice signals.

11. The exercise system of claim 7 wherein the first and second computers transfer, via the network interface, data representative of one or more simulated environments.

12. The exercise system of claim 7 wherein the first networkable exercise apparatus further comprises first sensing means, disposed substantially under the first user and coupled to the first computer, for generating a first signal representative of weight of the first user bearing down on the first sensing means.

13. The exercise system of claim 7 wherein the second networkable exercise apparatus further comprises second sensing means, disposed substantially under the second user and coupled to the second computer, for generating a second signal representative of weight of the second user bearing down on the second sensing means.

14. An exercise system, comprising:
(A) a plurality of networkable exercise apparatus each comprising:
(i) an exercise mechanism which a user manipulates to achieve exercise,
(ii) a steering mechanism disposed proximate the exercise mechanism which the user manipulates to indicate direction of motion,
(iii) a computer for generating a simulated environment and for monitoring user manipulation of the exercise and steering mechanisms to determine the user's position in the simulated environment, the computer including a network interface to allow communication over a communication channel, and (iv) a display system spaced from the user and coupled to the computer for providing a visual display of at least the user's position in the simulated environment;

the computer being configured to enable the user to (i) travel substantially unrestricted throughout the simulated environment by manipulating the exercise mechanism and the steering mechanism, (ii) modify user's course while traveling within the simulated environment, and (iii) participate in user selectable activities within the simulated environment; and (B) a central processing station to which is connected each of the plurality of networkable exercise apparatus via its respective network interface and through which passes all communications between the plurality of networkable exercise apparatus.

15. The exercise system of claim 14 wherein at least one of the plurality of networkable exercise apparatus further comprises sensing means, disposed substantially under the user and coupled to the computer, for generating a signal representative of weight of the user bearing down on the sensing means.

16. The exercise system of claim 14 wherein: the central processing station comprises:

receive means for receiving data sent by one or more of the networkable exercise apparatus over its respective communication channel, processing means for processing the received data, and transmit means for transmitting the processed data to one or more of the networkable exercise apparatus; and each of the plurality of networkable exercise apparatus sends, via its respective network interface, data about its respective user's manipulation of its respective exercise and steering mechanisms to the central processing station for processing.

17. The exercise system of claim 16 wherein the transmit means of the central processing station broadcasts the processed data to each of the plurality of networkable exercise apparatus over a high-bandwidth channel different from the communication channels which each networkable exercise apparatus uses to send its data to the central processing station.

18. The exercise system of claim 17 wherein the high-bandwidth channel comprises a cable TV channel.

19. The exercise system of claim 17 wherein:

the computers of one or more of the plurality of networkable exercise apparatus process the broadcast data to determine the position of other users in the simulated environment; and the display systems of those one or more apparatus visually display the position of the other users in the simulated environment.

20. The exercise system of claim 16 wherein the transmit means of the central processing station directs the processed data to certain ones of the plurality of networkable exercise apparatus over the same communication channels that those certain networkable exercise apparatus used to send their data to the central processing station.

21. The exercise system of claim 20 wherein:

the computers of the networkable exercise apparatus to which the data is directed process the data to determine the position of other users in the simulated environment; and the display systems of those apparatus visually display the position of the other users in the simulated environment.

22. The exercise system of claim 14 wherein at least one of the computers of the plurality of networkable exercise apparatus transmits, via its network interface, data representative of one or more simulated environments to at least one of the other computers.

23. The exercise system of claim 14 wherein the central processing station transmits data representative of one or more simulated environments to at least one of the plurality of networkable exercise apparatus.

24. A method for computerized networked exercising, comprising:

providing a first networkable exercise apparatus and a second networkable exercise apparatus, each comprising:

(i) an exercise mechanism which a user manipulates to achieve exercise, (ii) a steering mechanism disposed proximate the exercise mechanism which the user manipulates to indicate direction of motion, (iii) a computer for generating a simulated environment and for monitoring user manipulation of the exercise and steering mechanisms to determine the user's position in the simulated environment, the computer including a network interface to allow communication over a communication channel, the computer being configured to enable the user to (i) travel substantially unrestricted throughout the simulated environment by manipulating the exercise mechanism and the steering mechanism, (ii) modify user's course while traveling within the simulated environment, and (iii) participate in user selectable activities within the simulated environment, and (iv) a display system spaced from the user and coupled to the computer for providing a visual display of at least the user's position in the simulated environment;

sending data from the first networkable exercise apparatus to the second networkable exercise apparatus via the network interfaces, the data including information about the first apparatus' user's manipulation of the first apparatus' exercise and steering mechanisms;

processing, in the second apparatus' computer, the data received from the first apparatus to determine the position of the first apparatus' user in the simulated environment; and displaying, on the second apparatus' display system, the position of the first apparatus' user in the simulated environment.

* * * * *